H. HOPKINS.
CALCULATING MACHINE.
APPLICATION FILED OCT. 26, 1908.
1,026,443.
Patented May 14, 1912.
9 SHEETS—SHEET 1.
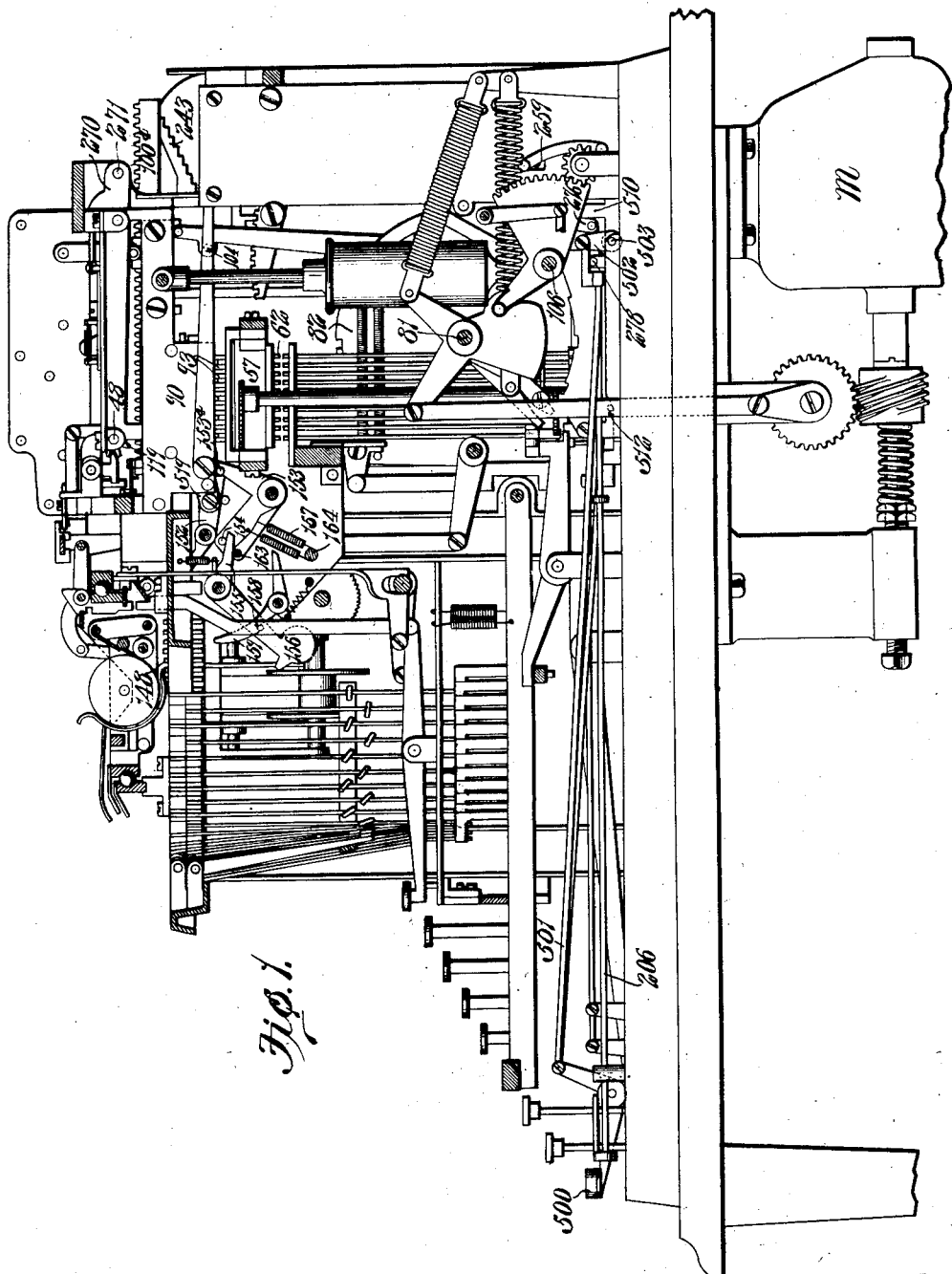
Witnesses:
Geo. Kuhn.
George Ladson
Inventor;
Hubert Hopkins.
By Bakewell & Cornwall Attys

H. HOPKINS.
CALCULATING MACHINE.
APPLICATION FILED OCT. 26, 1908.

1,026,443.

Patented May 14, 1912.
9 SHEETS—SHEET 2.

H. HOPKINS.
CALCULATING MACHINE.
APPLICATION FILED OCT. 26, 1908.
1,026,443.
Patented May 14, 1912.
9 SHEETS—SHEET 3.
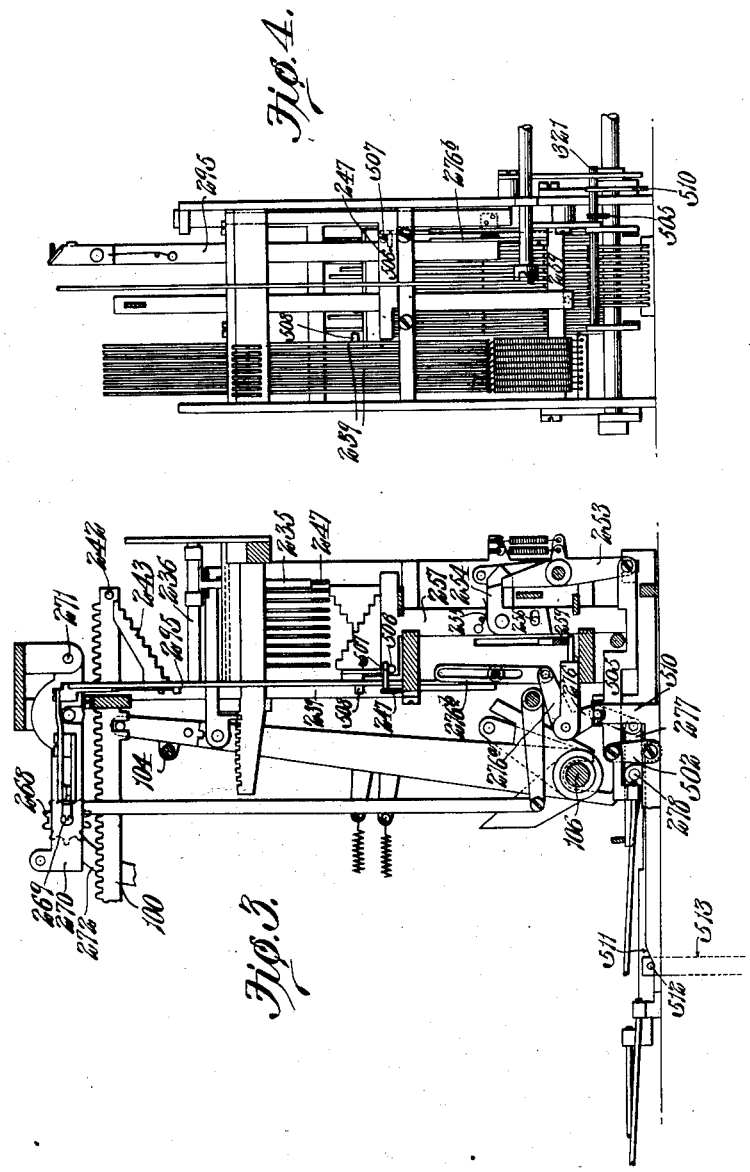
Witnesses:
George Ladson
A. J. McCauley
Inventor,
Hubert Hopkins.
By Bakewell & Cornwall Attys.

H. HOPKINS.
CALCULATING MACHINE.
APPLICATION FILED OCT. 26, 1908.
1,026,443.
Patented May 14, 1912.
9 SHEETS—SHEET 4.
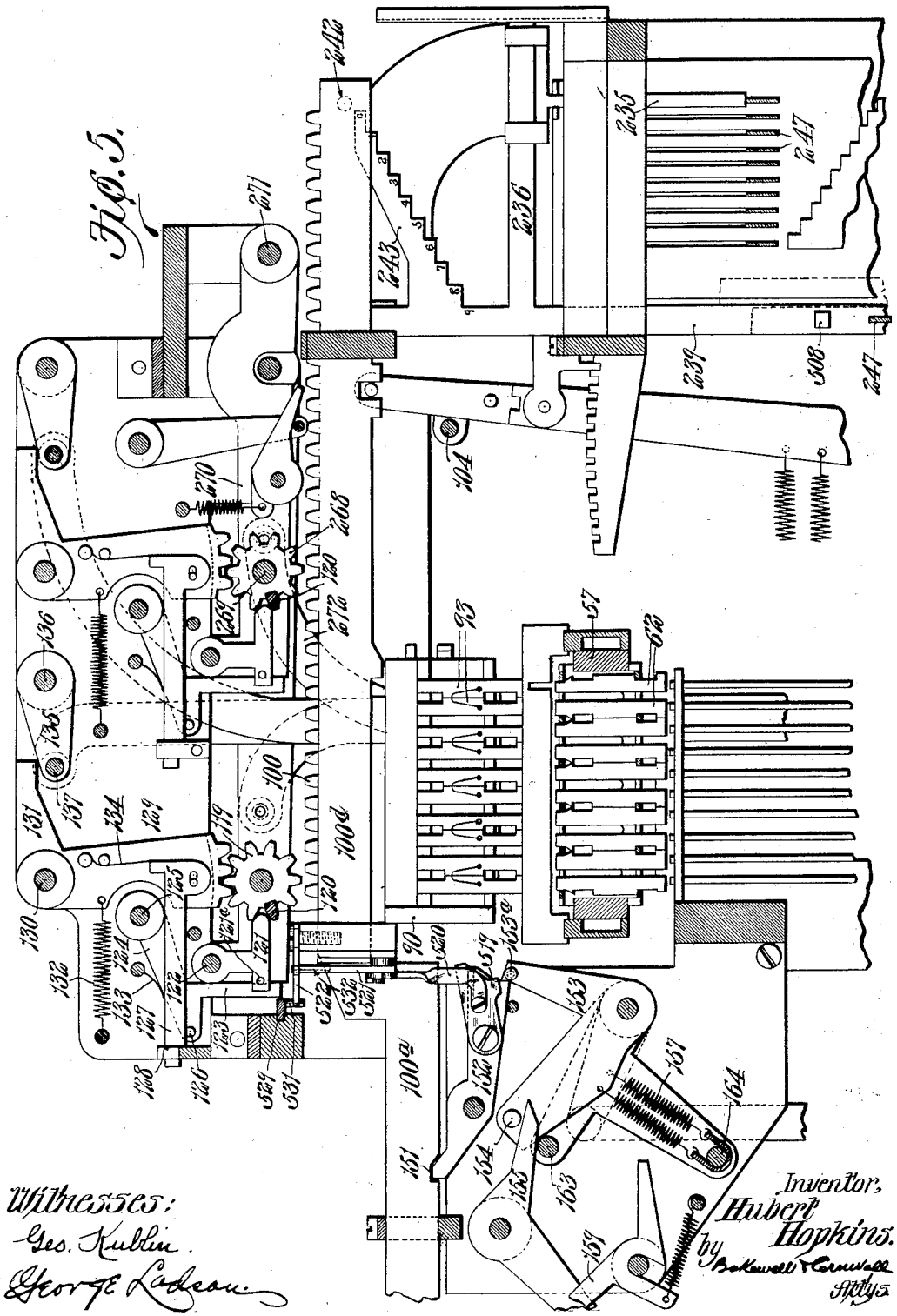
Witnesses:
Geo. Kullin.
George Ladson.
Inventor,
Hubert Hopkins.
by Bakewell & Cornwall
Attys.

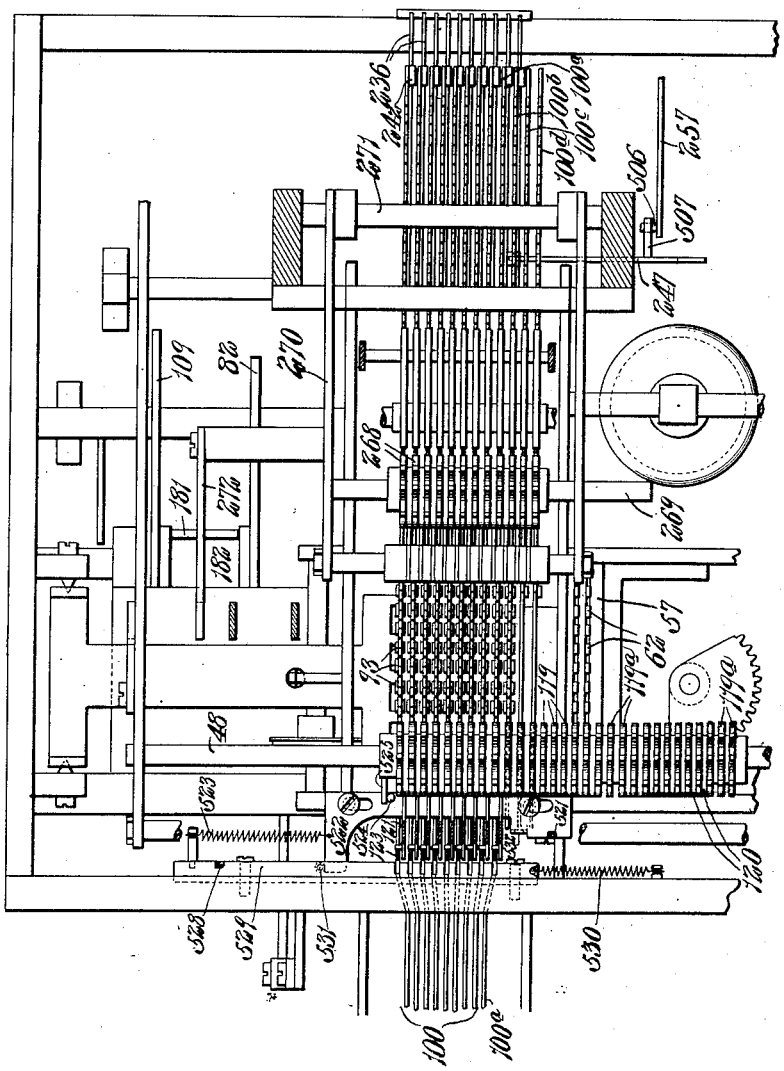

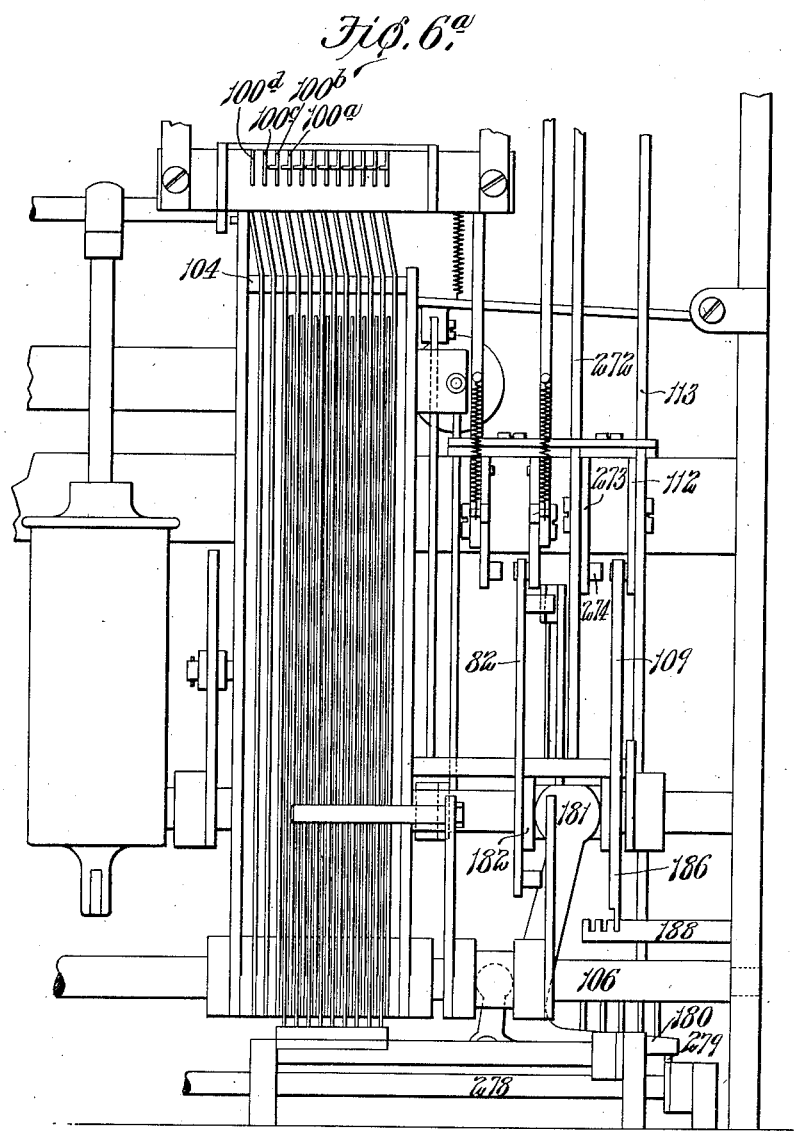

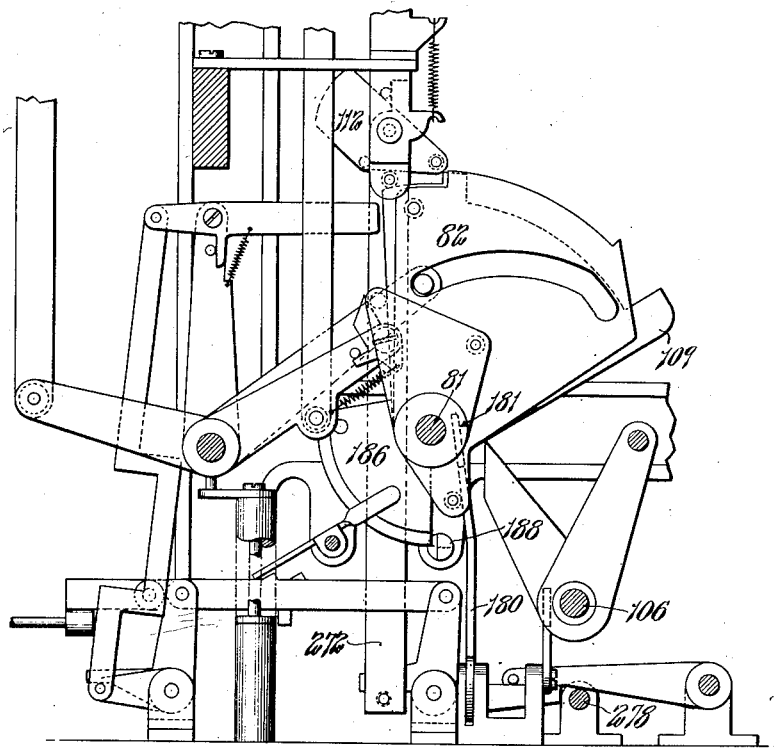

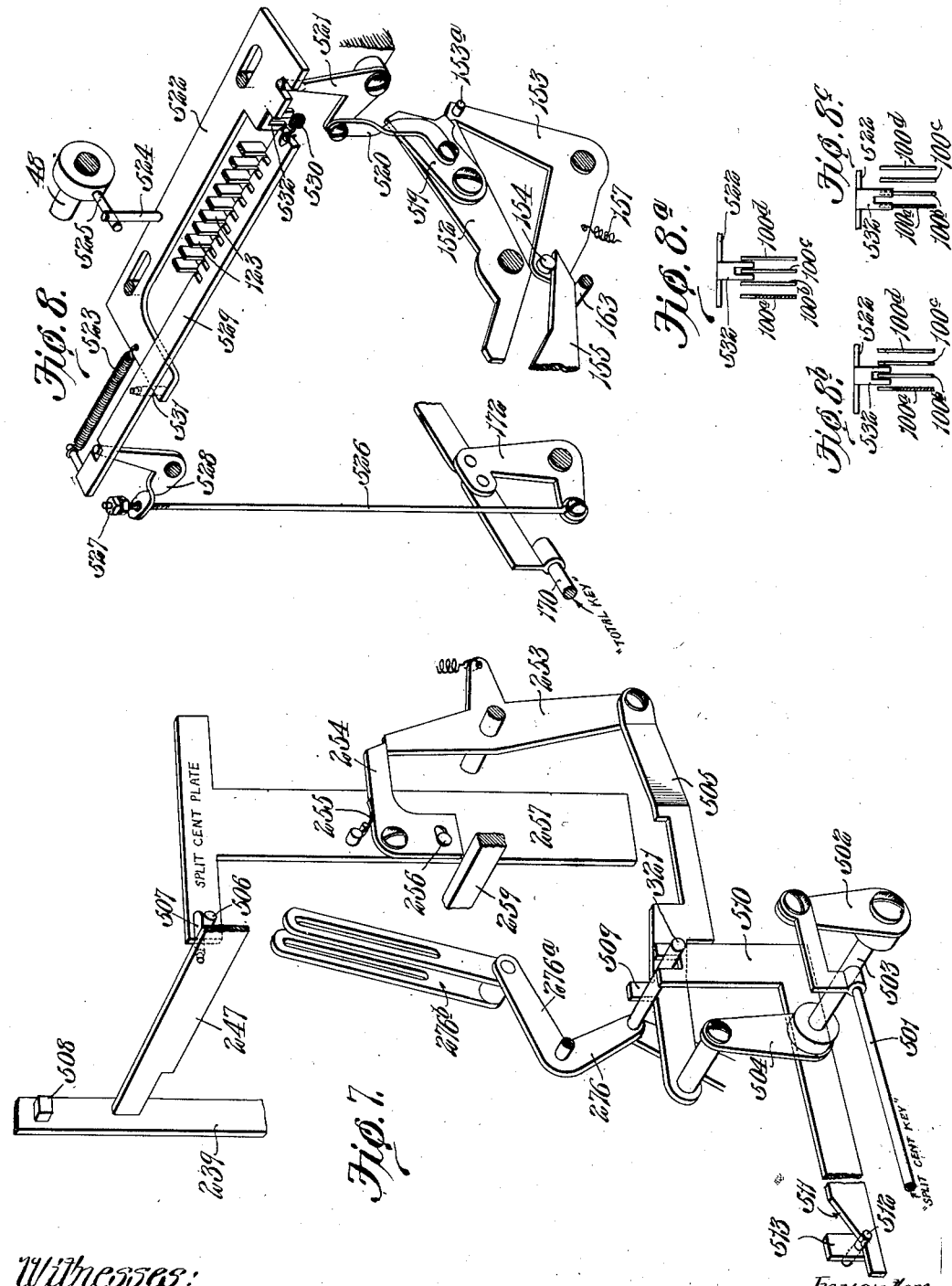

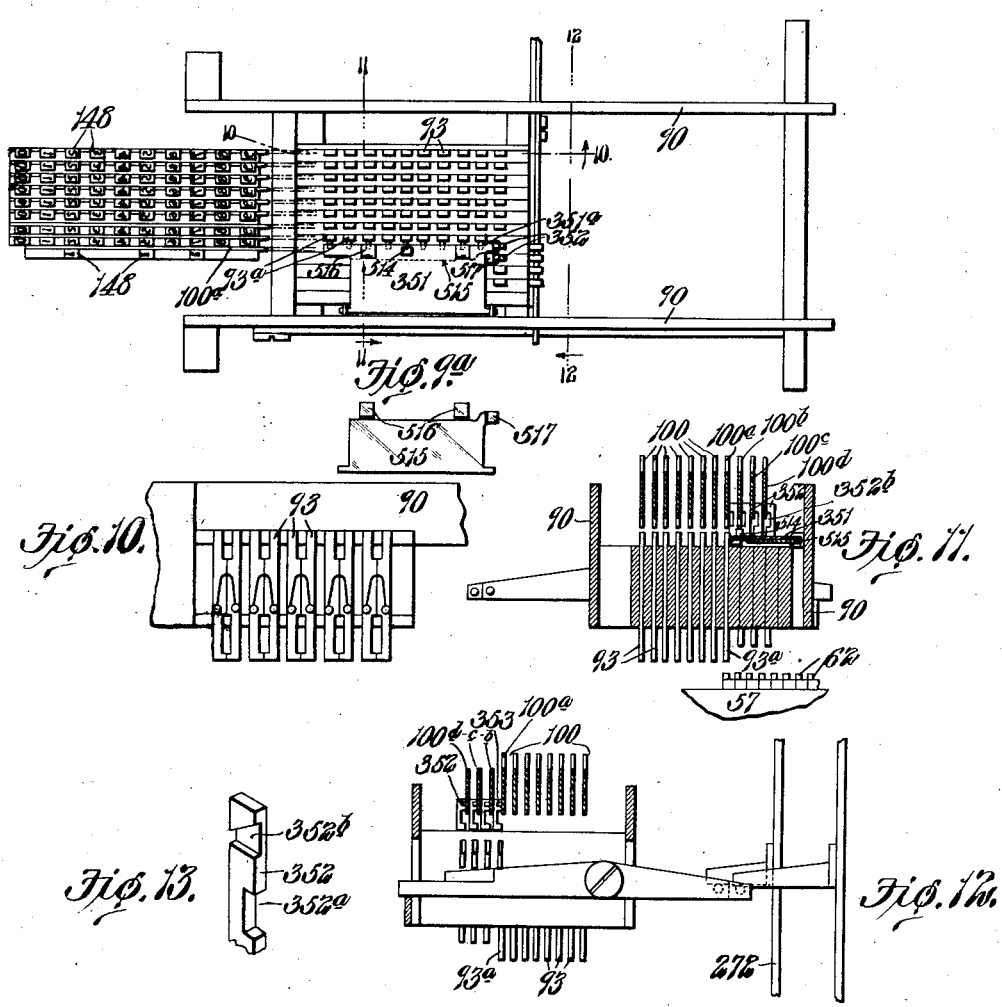

UNITED STATES PATENT OFFICE.

HUBERT HOPKINS, OF ST. LOUIS, MISSOURI, ASSIGNOR TO MOON-HOPKINS BILLING MACHINE COMPANY, OF ST. LOUIS, MISSOURI, A CORPORATION OF MISSOURI.

CALCULATING-MACHINE.

1,026,443.  Specification of Letters Patent.  Patented May 14, 1912.

Application filed October 26, 1908. Serial No. 459,602.

*To all whom it may concern:*

Be it known that I, HUBERT HOPKINS, a citizen of the United States, residing at St. Louis, Missouri, have invented a certain new and useful Improvement in Calculating-Machines, of which the following is a full, clear, and exact description, such as will enable others skilled in the art to which it appertains to make and use the same, reference being had to the accompanying drawings, forming part of this specification, in which—

Figure 1 is a side elevational view, partly in section, of my improved machine; Fig. 2 is a plan view illustrating the keys and key bar connections of the adding mechanism; Fig. 3 is a vertical longitudinal sectional view through the rear end of the machine illustrating the multiplying mechanism; Fig. 4 is a front elevational view of the parts illustrated in the multiplying mechanism; Fig. 5 is an enlarged sectional view of the totalizers and their actuating devices; Fig. 6 is a top plan view of the totalizers and their actuating devices; Fig. 6ª is a rear elevational view of the parts shown in Fig. 6; Fig. 6ᵇ is a side elevational view of certain of the parts shown in Fig. 6; Fig. 7 is a detail view of the mill-determining key; Fig. 8 is a detail view of certain connections of the total key; Figs. 8ª, 8ᵇ and 8ᶜ are detail views illustrating the means for controlling the movement of the decimal rack bars; Fig. 9 is a plan view of the intermediate field of stops; Fig. 9ª is a detail view of one of the plates controlled by the stop pins; Fig. 10 is a sectional view on the line 10—10 of Fig. 9; Fig. 11 is a sectional view on the line 11—11 of Fig. 9 looking in the direction of the arrow; Fig. 12 is a sectional view on the line 12—12 of Fig. 9 looking in the direction of the arrow; and Fig. 13 is a detail view of the releasing bar for the decimal racks.

This invention relates to a new and useful improvement in calculating machines of that type illustrated in Belgian Patent No. 202,081, dated August 21, 1907, and also in my application for United States Letters Patent Serial No. 310,739, filed April 9, 1906.

The following are the objects of my present invention:

(*1.*) *Determining the disposition of the mills or tenths of a cent, by the use of a "split cent" key.*—In many business houses, especially wholesale dry goods houses, many computations are made which involve mills, as, for instance, in the following item:

15¾ yds. calico @ 5¼c per yd_____$ .826875
16¾ "   cambric @ 14½c per yd__ 2.3659375

In the above illustrations it will be observed that in both extensions which I have carried out in full, tenths of a cent, and hundredths of a cent, etc., appear. Business houses usually have some fixed rule as to the fractions of a cent, or "split cent" as, for instance, if the amount is less than five mills the customer gets the benefit of the fraction and it is computed as "no cent," and if the amount is five mills or over the house gets the benefit of the fraction and it is computed as one cent. Thus, in each of the examples above given the fraction of a cent is greater than five mills, and consequently the house would be entitled to treat the two extensions as $ .83 and $2.37 respectively, the house being benefited in both of the examples given. My present invention contemplates the provision of means whereby the machine will automatically eliminate fractions of a cent computed in tenths, hundredths, etc., where said fraction is less than a predetermined division point, and where the fraction is above the predetermined division point the machine will automatically add the difference between the fraction and one cent and compute it as one cent.

(*2.*) *To decimally compute fractions of yards.*—Business houses also require that bills be made out where fractions of a yard are involved by the use of the proper fraction and not the equivalent decimal. These fractions are usually indicated; for instance, if in quarters, as ¹, ², and ³, or if the yardage was computed in eighths, the same would be indicated by similar small numerals 1 to 7 inclusive with a dash under each, each small numeral whether expressing quarters or eighths being understood, by the presence of the dash, to mean the number of quarters or eighths represented by the numeral, depending upon the practice of the house in computing in quarters or eighths, which, of course, is understood by the customers. In my present machine I have illustrated means for computing quarters of yards and automatically converting the fractions into decimals so that they can be added decimally and printed as fractions.

(*3.*) *Preventing the printing of computed decimals.*—This feature of the present application relates to means which are provided for preventing the type hammer from coöperating with the tenths decimal rack bar in certain operations of the machine so that confusion in the items or totals listed and printed is prevented.

(*4.*) *Rigidly supporting the carrying devices.*—This branch of my present application really involves a structural improvement rather than a principle of operation, but I refer to it here because it is a new feature and not present in my former patent.

(*5.*) *Preventing the movement of the decimal rack bars upon the operation of a total key.*—This branch of my present application relates to means which is positioned by the operation of the "T" total key to prevent the movement of the decimal rack bars when said key is depressed, so that in the taking of a total it is impossible for the decimal to be printed in the total. This feature, however, may be eliminated, if desired, and the total contain a printed record of the decimal or tenths of a cent, if such is desired.

In describing my invention, which I have divided into five branches, as above indicated, I shall not go into a detailed description of the calculating machine illustrated and described in the said Belgian patent, and in my said application, but shall, where possible, employ the same reference characters to indicate like parts, starting with the reference character 500 to indicate the parts which are new and identified with my present invention.

The keys in group A (see Fig. 2) are the digit keys, while those in group B are the multiplier keys. Those bearing the letters "D", "E", "T" and "P" are known as result keys, these letters indicating: D=decimal, E=extension, T=total, P=product.

The decimating key 361 marked "Dec." is employed to eliminate the unnecessary decimals in the product. The error key 206 is employed to correct errors which are erroneously introduced into the machine, etc. The "motor" key when depressed will cause the motor M to operate the power shaft and drive the machine in a manner similar to hand-operation in the use of a handle in a well known manner.

500 indicates the "split cent" key identified with my present improvement, whose function and operation will be hereinafter described.

The above described keys are in the key board of the adding department of the machine. The typewriting mechanism and its key board are shown in Fig. 1; but as their function is well understood and as they form no part of the present invention they will not be described in detail.

I will briefly describe the operation of introducing an item into one of the forward totalizers 119. If the number to be introduced into the machine is 358 the corresponding keys in group A are depressed, that is, first the "3", then the "5" and then the "8" key. These keys successively position the setting up pins 62 in the traveling carriage 57, and advance said carriage to the left three steps. The movement of the carriage to the left brings the positioned setting up pins under a field of stop pins 93 arranged in a frame 90. The parts being in the position above described, the "motor" key is depressed (or the handle is pulled forward, if it is a hand-operated machine), and the following occurs: The traveling carriage is lifted so as to cause the positioned setting up pins to lift the registering stop pins 93 into the path of the appropriate rack bars. The traveling carriage is lowered and restored to its home position. The proper rack bars which are to be moved forward against the stop pins are permitted to move forward by the restoring bar 104 until they are arrested by their respective stop pins. The frame carrying the forward totalizer wheels is now depressed so that one of the forward totalizers 119 is thrown into mesh with the teeth of the rack bars. The power shaft 81 has now been rocked to the forward extremity of its movement, and upon the return movement, equal to the rearward movement of the handle, would cause the restoring bar 104 to pick up the rack bars and restore them and the operated totalizer wheels 119 proportionately. This movement of the power shaft also restores the stop pins 93, and at the extremity of the movement the totalizer wheels 119 are disengaged from the restored racks 100. Should another item be introduced into the totalizer wheels 119 in operative relation to the rack bars, the same movements would occur, and in the event that carrying had to be effected in the totalizer such carrying would be done by the mechanism located adjacent to and above the wheels 119, which it is deemed unnecessary to here describe.

To obtain a total, the total key T is depressed, which causes the wheels 119 to engage with the racks 100, and the motor key is then operated, or the handle pulled forward, which results in the racks moving forward, reversely rotating the wheels 119, until said wheels are brought into zero position by their tripping projections, in which event the printing type 148 on the forward ends of the rack bars are in proper position to print the total, and the printing hammers 156 are released at the proper time to make a printing impression both of the items introduced into the totalizers and of the totals thereof.

5. If it is desired to introduce an item into the rear totalizer 268 to the exclusion of the forward totalizer, the item is set up on the key board and the D key is depressed while the power shaft operates. If it is desired to set up the multiplicand in the multiplying devices, said item is set up on the key board and the E key depressed, which E key will cause the pendants 235 to be positioned to indicate said item and properly coöperate with the cross arms 247.

To multiply a number indicated by the pendants 235 the number at the left of the multiplier is struck on the proper key in group B, after which the operating handle is pulled twice; or, as in the present case, where the machine is motor-driven, the motor M will drive the machine two operations upon the operation of any one of the multiplier keys. The multiplier is thus successively set up on the keys in group B, and the partial products resulting from such multiplication are added together in the wheels 268 forming the complete product. Means are present to cause the product totalizer 268 to move leftward step by step as each succeeding multiplier number is pressed upon the keys in group B, and where decimals are present in the multiplicand or multiplier the decimating key 361 is operated a number of times equal to the number of decimals in the multiplicand or multiplier. In this manner the unnecessary decimals are eliminated from the product.

To obtain the product accumulated in the totalizer wheels 268, the P key is operated and the motor key depressed or the handle pulled, as the case may be. To hold the T or P keys down while the machine is making a full stroke will cause the total or the product, as the case may be, to be retained in the totalizer; but to press the T or P keys down and release them, will permit them to rise when the power shaft is at its forward limit of movement so that said totalizers will stand clear at the end of the operation.

The D key before referred to in addition to its function of causing the item set up on the keys in group A to be introduced into the rear totalizer wheels 268 has another function of arresting the traveling carriage, when operated before a key in group A is depressed, to prevent said carriage from advancing the usual step to the left incident to the operation upon the depression of any of the digit keys in group A, and consequently the last-positioned setting up pin in said carriage will not be located under the units (or cents) rack bar at the end of the setting up operation, but will be located one step behind, or to the right of, such position, to wit, under what is known as the decimal rack bar 100ᵃ. For convenience of reference I shall in my further description of this decimal rack bar 100ᵃ, designate it as the tenths rack bar, and the rack bar 100ᵇ to the right thereof as the hundredths decimal rack bar. To illustrate the use of these rack bars I will mention the introduction into the machine of the item $4.37½. This item would be introduced into the machine through the keys in group A as follows: First the "4," then the "3," and then the "7" keys would be depressed, and before the "5" key (which bears the fraction character ½) was depressed the D key would be operated, which would prevent the stepping of the carriage and cause the setting up pin to be located one step to the right of the units (or cents) rack bar 100, and under the series of decimal stop pins 93ᵃ.

The tenths decimal rack bar 100ᵃ is not provided with printing type running from 1 to 9 in the present machine, because the printing of decimals or fractions of a cent is not desired in the present machine. The said rack bar in the machine of my aforesaid patent, however, is provided with printing type from 1 to 9 so that these decimals could be printed.

Both of the racks bars 100ᵃ and 100ᵇ are also used for clearing the wheels of the totalizer 268, which wheels are positioned during the operation of multiplication. When the decimating key is operated to eliminate the unnecessary decimals in the product, wheels 268 are stepped to the right of the rack bars carrying type, as it is not desired to print the decimals so eliminated. It is necessary, however, to return the wheels 268 to zero and this is done by means of the clearing rack bars 100ᵇ, 100ᶜ and 100ᵈ, the former of which has been referred to as the hundredths decimal rack bar. These rack bars do not carry printing type.

The laterally movable paper carriage upon which the paper to be printed is supported is stepped a letter space to the left at each operation of the typewriter keys as usual, and tabulating keys are provided to position said carriage. Means are also provided to operate an escapement mechanism connected with the laterally shiftable groups of totalizer wheels 119 so that as the paper carriage moves from right to left the adjustable stops on said carriage operate the escapement mechanism and permit the group of totalizer wheels in registration with the actuating racks to be displaced by a spring, and the next adjacent group of totalizer wheels at the right brought into coöperative relation to said racks. When the paper carriage is restored to its home position or moved from left to right, it will pick up the forward totalizer wheels, if they have been displaced, and restore them to their starting position, in which the group of totalizer wheels at the left will be in operative relation to the actuating devices.

The above description, with the exception of the reference to the key 500 and the motor key is applicable to the construction illustrated and described in the Belgian patent referred to.

*Determining the disposition of mills.—* Referring to Figs. 1, and 2, 500 is the "split cent" key, as it has been called, which is in the form of a bell crank lever and is connected by means of a rod or wire 501 to a rock arm 502 mounted on a rock shaft 503 (see Fig. 7). The shaft 503 carries another rock arm 504 connected to a link 505, in turn connected to a tripping pawl 253. This tripping pawl 253 is like the tripping pawls which are operated by the multiplier keys in group B, and which select the proper tens and units multiplying plates for obtaining the partial products. The pawl 253 coöperates with a pivoted shoulder plate 254 which is held depressed by a spring 255, and which has a slot and pin connection 256 with the shank 257 of a "split cent" plate corresponding to the zero multiplying plate above referred to. The "split cent" plate, like the zero multiplying plate, lifts all of the stepped stop bars into zero position to prevent the forward movement of all of the racks except the tenths decimal rack, with respect to which it places its complementary stepped stop bar in the "5" position, permitting said tenths decimal rack to move forward five teeth. Were it not for the fact that the zero multiplying plate steps the product totalizer wheels 268 leftward one step when operated, the split cent key could be connected to the pawl 253 of said zero multiplying plate. However, this would necessitate the operation of the decimating key one extra stroke at every operation of the "split cent" key, and to avoid this I prefer to use a special "split cent" plate.

The upper end of the plate 257 is provided with a pin 506 which coöperates with a pin 507 on a cross arm 247 like the other cross arms bearing the same reference character in the multiplying mechanism. This cross arm 247 coöperates with a stop 508 whose position is equal to a five-stop on the tens multiplying plate. Stop 508 is arranged on the stepped stop bar 239 carrying the stepped projection 243 which is provided with the usual extension 236 and the pendant 235. The said stepped stop bar 243 coöperates with the lateral projection 242 on the decimal rack bar 100ª.

In making extensions as described in connection with the example given in the first part of this description, if we are to multiply the 15¾ yards of calico by 5¼c, the price per yard, the multiplicand 15.75 is set up in the multiplying devices identified with the hundredths, tenths, units and tens; or, if expressed in money value, in the hundredths, mills, cents and dimes columns. The multiplier is now struck on the keys in group B, first the "5" key, then the "2" key, and then the "5" key, being 5¼¢ expressed decimally, without, however, using the decimal point or zero dimes in the expression. The decimating key is now stepped back two spaces, with the result that the six wheels at the right of the totalizer 268 will represent "826875". The last three figures at the right would not be printed as they are located over the typeless clearing racks, 100ᵇ, 100ᶜ and 100ᵈ. We now wish to determine, according to the rule of the house, what disposition to make of the six tenths and eight hundredths of a cent appearing in the product. This is accomplished by depressing the 500 key and operating the handle, or, as shown in Fig. 7, setting the motor in operation so that the power shaft 81 will be rocked. To set the motor in operation, a projection 509 on the link 505 will engage the pin 321 illustrated in said Belgian patent, which pin extends into a slot in the upper end of a bar 510, said bar having a cam face 511 to coöperate with a pin 512 on a motor-releasing bar 513. Thus when the key 500 is operated the bar 510 is moved forwardly and the motor released to make a driving operation. Or, as stated before, when the key 500 is operated, the handle is pulled forward. The operation of the key 500 will operate lever 253 and release the pawl 254 and permit the lower end of the pawl 254 to move forwardly over the lifting bar 259 which is raised and lowered at each operation of the power shaft 81. Thus the "split cent" plate 257, shown in Fig. 7, will be lifted by the bar 259 and carry with it cross arm 247, which arm will move idly through what is equivalent to five steps of any of the multiplying plates. At the end of this idle movement said cross arm will engage the stop 508 and lift the stepped stop bar 239 until the step No. 5 (see Fig. 5) is brought opposite the pin 242 of the tenths decimal rack bar 100ª. The rack bar 100ª will, when the restoring bar 104 swings in its arc of travel, move forward a distance equal to five rack teeth, in which position it will be arrested by its pin 242 engaging the fifth stop of the stepped extension 243. The depression of the key 500 will also cause the wheels 268 to engage with the racks when the handle is in its forward position, so that the five will be added to the wheels 268 through the tenths decimal rack bar 100ª, as in the ordinary operation of introducing numbers into the rear totalizer. This ordinary operation is as follows: The rear totalizer wheels 268 are mounted on a shaft 269 which finds bearings in a rocking frame 270. This rocking frame is pivotally mounted on a shaft 271 and has a rod 272 pivoted to its free ends. This rod is provided with a tappet, 273, which is rocked to and fro by a cam plate. The key 500, like any one of the multiplier keys in group B, coöperates with toggle links 276 connected to a rock arm 277 on a rock shaft 278 (see Fig. 3). This rock shaft 278 has a rock arm 279 arranged under the lower member 180 of a bell crank lever (see Fig. 2), whose other member 181 (see Fig. —) is provided with a head fitting in an annular groove in the hub or sleeve 182 which carries the cam plates 82 and 109. In this manner the depression of the key 500, like the depression of any one of the multiplier keys, will cause the hub 182 to be shifted crosswise the machine to what may be termed the "third" position, in which position the pin 274 of tappet 273 coöperates with cam plate 109 and rocks the rear totalizer frame. In this third position, the extension 186 of plate 109 enters the innermost slot of post 188 and holds the parts in operative position during the operation of the machine.

The means for breaking the toggle 276 and restoring the plate 109 to normal position is the same means which coöperates with the units multiplying plate in the multiplying operation, and, briefly stated, consists of a bar 295 having a pin on its lower end which coöperates with a slotted link 276ᵇ connected to the extension 276ᵃ of the toggle. When the toggle is straightened upon the operation of the key 500 (or any one of the multiplier keys), the slotted link 276ᵇ is depressed, and when the bar 295 is raised in the operation of the machine its lower end will engage the upper end of the slotted link 276ᵇ and lift the same, thus breaking the toggle and restoring the parts to normal position.

In the example under consideration, the product register wheels 268 stand, as a result of multiplying 15.75 by .0525, as .826875. I have supplied the decimal points, which are of course not present in the register wheels. In order to illustrate the position of the above number in the product register I will refer to the following diagram where the several horizontal lines represent the several racks in the particular machine illustrated in the accompanying drawings. Appropriate designations are applied to each line so that it will be unnecessary to refer to them here. A wide space is preferably left between the printing type of the hundreds and tens rack bars for the insertion of a decimal, if desired, or the number may be printed on a sheet of paper containing a rule line to indicate the position of a decimal point. Where, however, the same printing type are used to express concrete values as well as money, I prefer not to print the decimal point.

```
0_____(1)  Hundreds of thousands (printing) rack 100.
0_____(2)  Tens of thousands (printing) rack 100.
8_____(3)  Thousands (printing) rack 100.
2_____(4)  Hundreds (printing) rack 100.
6_____(5)  Tens (printing) rack 100.
8_____(6)  Units (printing) rack 100.
7_____(7)  Tenths clearing rack 100ᵃ.
5_____(8)  Hundredths clearing rack 100ᵇ.
0_____(9)  Thousandths clearing rack 100ᶜ.
0_____(10)  Tenths of thousands clearing rack 100ᵈ.
```

Upon operating the decimating key twice the product register wheels 268 will be moved two steps to the right so that the number will appear in said wheels as follows:

```
0_____(1)
0_____(2)
0_____(3)
0_____(4)
8_____(5)
2_____(6)
6_____(7)
8_____(8)
7_____(9)
5_____(10)
```

In the above diagram I have used the numerals in parentheses to represent the ten rack bars of the preceding diagram. Of these ten rack bars it will be remembered that only the first six bear printing type and print from the units (or cents) rack bar up through the higher denominations. The tenths decimal rack bar 100ᵃ carries small type to print fractions as will hereinafter appear, but means are provided to prevent the printing of these fractions in making the extensions in connection with the middle and right-hand groups of forward totalizer wheels 119 as will hereinafter appear.

The operation of the key 500, as before described, will, when the power shaft is operated, add five to rack bar No. 7 in the above diagrams (the tenths rack bar 100ᵃ), so that the wheels 268 with five added will now stand as follows:

```
0_____(1)
0_____(2)
0_____(3)
0_____(4)
8_____(5)
3_____(6)
1_____(7)
8_____(8)
7_____(9)
5_____(10)
```

In the last diagram I have underscored the figures which will not be printed or transferred to certain of the forward totalizers when the P key is pressed and the power shaft operated.

From the above it will be seen that in all the extensions involving fractions of a cent whenever the key 500 is depressed and the power shaft operated, five will be added to the tenths decimal rack 100ª; that if the register wheel 268 in operative relation to said rack at this time stands at "5" or over, the added five will cause the tripping projection on said wheel to operate the carrying devices so that the wheel identified with the next higher column (the cents or units wheel) will be operated in the process of carrying to represent the one which is carried to it; and that all of the racks to the right of the units rack, carrying no printing type, will not print the decimals.

If the number standing on the register wheel 268 in operative relation to the tenths rack bar 100ª was less than five, the addition of five thereto upon the operation of the power shaft after the key 500 had been depressed would not move said wheel far enough so that its tripping projection would actuate the carrying devices. In other words, the wheel would not be moved past zero, and consequently no carrying would be effected. The cents or units wheel would not be moved, and when the P key was depressed and the power shaft operated the number printed would be the number originally standing on the wheels, less the eliminated decimals.

In the first operation, where the key 500 caused the units wheel to be operated by the carrying mechanism, the house got the benefit of the fraction, which, as each succeeding extension was carried on, would be added as a whole number in certain of the forward totalizers. In the other case, where the units wheel was not advanced by the carrying mechanism after the operation of the key 500 the customer would get the benefit of the fraction of the cent.

It is obvious that a cent may be split at any point by adjusting the position of the projection 508 on the bar 239; for instance, by lowering said projection the cross arm 247 would more quickly engage it, and consequently bar 239 would be lifted higher so that a number greater than five would be added in the wheel coöperating with the rack 100ª. On the other hand, if the projection 508 was raised the advantage would be with the customer. I have not shown any means for adjusting the stop 508, but I contemplate positioning said stop as required, depending upon where the owner of the machine determined the cent shall be split.

*Decimally computing fractions.*—If it is desired to compute the total yardage, as, for instance, in the example stated in the first part of this description, that is, add the two items 15¾ yards to 16¾ yards, making a total of 32½ yards, these numbers are respectively introduced into the left-hand group of forward totalizers at the time they are set up in the multiplying devices as multiplicands. Each of the keys in group A which is nearest (but lower than) the fraction to be computed, may be marked as, for instance, ¼—½—¾. To express the fraction ¼ decimally, the number "1" is divided into four parts, the quotient being .25; the decimal equivalent to ½ is .50; and the decimal equivalent to ¾ is .75. The "2" key is the nearest lower key in group A to the fraction ¼, expressed decimally, and this key may be marked "¼" in front of the numeral 2, to avoid confusion with the fraction as ¼, as shown in Fig. 2. The fraction ½ expressed decimally is .50, and hence the "5" key in group A may be marked "½." The fraction ¾ being expressed decimally .75, the "7" key in group A, being the next lower key, is inscribed "¾."

In introducing concrete numbers representing yards or things and selected fractions thereof, the machine is operated as usual, that is, in the first stated item 15¾ yards is set up on the key board by striking the "1" and "5" keys in group A, then the "D" key (to prevent the stepping action of the carriage), and then the "7" key (which is also marked "¾").

As the decimal racks are normally restrained from movement, they being brought into action only under special conditions, special means are provided for releasing said racks, and special stops are provided for limiting the forward movement of said racks. The stop pins 93ª (see Fig. 9) which control the forward movement of the tenths rack bar 100ª are each provided with lateral projections or shoulders which rest under a plate 351 pivoted at its side edge to one of the bars 90. The rear free edge of this pivoted plate has a projection 351ª which coöperates with a latch bar 352 (see Fig. 13) by entering into a recess 352ª in said bar. When any pin 93ª is lifted the latch 352 (shown in Fig. 13) is raised, which causes the upper end of said latch to move out of the path of a pin 353 on the decimal rack bar 100ª, and place a recess 352ᵇ in the side of the latch 352 in register with said pin, whereby the decimal rack bar 100ª may move forward under the impelling action of its spring. By this means the tenths decimal rack is not only released but a stop is positioned to arrest its forward movement. The upper edge of the recess 352ᵇ, as shown in Fig. 13, is inclined so that when the tenths decimal rack is restored to normal position the pin 353 will engage said inclined portion, lifting the latch, which latch then drops to its normal position in front of the pin 353. Thus in the example under consideration the fraction ¾ to be expressed decimally is in part so expressed by positioning the stop 93ª identified with the "7" digit key in group A. It is now necessary to release the hundredths decimal rack bar and arrest it in its "5" forward position. This is accomplished by providing a plate 351 with a stop 514 in alinement with the "5" series of stops, as shown in Fig. 9.

In order to raise the plate 351 so as to position the stop 514 in the path of the hundredths decimal rack bar 100ᵇ, means are provided to operate the plate 351 indirectly, as follows: 515 indicates a plate pivoted to the side frame 90 and constituting what is practically the lower half of the plate 351. The free edge of the plate 515 does not, however, lie over the lateral projections of the stop pins 93ª except in the cases of the two and seven stop pins, and in these cases the plate 515 is provided with projections 516 (see Fig. 9ª), which register with recesses in the free edge of the plate 351. In fact, these projections 516 extend up into the recesses in the plate 351 and form part of said plate when either the "2" or the "7" digit keys in group A are operated. Plate 515 also has a rearward extension 517 which coöperates with a latch 352 identical in all respects to the latch shown in Fig. 13, but which latch in the instance under consideration coöperates with the hundredths decimal rack bar 100ᵇ, normally restraining it from movement, but releasing it whenever the plate 515 is lifted upon the operation of either the "2" or the "7" digit key. In the example under consideration the fraction ¾ is set up by pressing the "D" key and then operating the "7" key, which latter operation lifts the plate 515 through the "7" stop pin 93ª, which not only provides, by the positioned stop pin 93ª, a stop for the tenths decimal rack bar, but by the upward movement of the plate 351 the stop 514 thereon is also positioned to arrest the hundredths decimal rack bar when it moves forward. The hundredths decimal rack bar is, as before described, released by its latch 352 being raised by the projection 517 on the plate 515.

From the above it will be seen that whenever the "2" or the "7" digit key in group A is operated, following the operation of the "D" key, the carriage is held so that the pins 62 are located under the stop pins 93ª; and that the elevation of the plate 515 will not only release the tenths decimal rack bar, but the hundredths decimal rack bar also, and position stops for both of said rack bars. In other words, when a key in group A is operated, which key exactly expresses a fraction decimally, or which key nearly expresses a fraction decimally, a stop is positioned for the tenths, or tenths and hundredths bars, which latter are automatically released where it is necessary to properly express the fraction.

In the event that it is desired to express eighths decimally, it is obvious that the thousandths rack bar would have to be released, and that a third plate like the plate 515 would have to be used to release the proper stops in the thousandths column.

In those cases where the fraction can be expressed in tenths, as, for instance, one-half, which equals .5, it is obvious that it is unnecessary to release the hundredths rack bar, and therefore the stop pin 93ª will only operate the plate 351 which, while positioning the "5" stop for the hundredths rack bar, will not permit said hundredths rack bar to move to coöperate with said stop. Indeed, in every other case except where the "2" and "7" stop pins 93ª coöperate with projections on plate 515 to release the hundredths rack bar, the plate 351 alone is operated to release the tenths rack bar. In this manner the capacity of the machine in computing mills is not impaired in the least.

To print the fractions ¼, ½ and ¾, although said fractions are computed decimally in the machine, I provide means whereby when the stops 93ª are positioned the tenths decimal rack 100ª will move forward and present in the printing line a small type ¹, ², and ³ with dashes thereunder, if desired, corresponding to the expression of said fractions decimally. This is shown in Fig. 9, where it will be seen that the tenths decimal rack bar 100ª is provided with a printing type 148 bearing the character "¹" in the place where the printing type bearing the character "2" would normally be; also the type bearing the printing character "²" in the place where the "5" type would normally be; and a type bearing the character "³" in the place where the type "7" would normally be. In this way, whenever a fraction is to be set up on the key board a record is made thereof by the printing mechanism.

In cases where extensions are carried out in mills, or fractions of a cent, it may not be desirable to print small figures representing one, two and three quarters when 2, 5 and 7 mills were meant.

*To prevent the printing of fractions.*— In the machine shown in the accompanying drawings it is intended that extensions where computations in tenths of a cent are carried on shall be done in connection with the middle and right-hand group of totalizer wheels 119. The group of totalizer wheels 119 at the left are to be used in adding concrete numbers where fractions expressed in quarters are to be computed decimally. In the latter case it is desired to print the fractions by operating the printing hammer identified with the tenths decimal rack bar; while in the former case it is desired to prevent the operation of said printing hammer because the tenths decimal rack bar only carries three printing type and they do not properly express tenths of a unit.

Referring now to Figs. 5, 6 and 8, 152 indicates the restraining pawl identified with the printing mechanism, whose forward end coöperates with an inclined face 151 in the lower edge of the type carrying rack bar. This pawl 152, when the rack bars are home, engages one member of a bell crank lever 153 whose other or forward member carries a pin 154 resting upon a tailpiece 155 of the type hammer 156. Springs 157, preferably arranged in pairs, are connected to the forward member of the bell crank lever so as to draw the same down whenever the rear member thereof is released by the restraining pawl 152. In operation, whenever rack bars 100 and the tenths decimal rack bar 100ª move forward, the rear end of the restraining pawl associated therewith is raised out of engagement with the member 153 of the bell crank lever, and consequently the pin 154, under the impelling action of springs 157, bears upon the rearward extension 155 of the type hammers. As the operating shaft rocks forward, and after all of the rack bars are positioned the bars 163 and 164 are depressed, the latter increasing the tension of springs 157 and the former striking the projections 151 and lifting all of the hooked pawls 159 out of engagement with the pins 158 on the printing hammers. In this manner, any of the printing hammers which may have been previously released by the restraining pawls 152 are thrown up against the type, forcing the type to make a printing impression on the paper supported by the platen on the typewriter carriage. As the bar 163 returns to its normal position it will restore all of the actuated type hammers to normal position, reëngaging the hooked pawls 159 therewith, and at the same time swing all of the bell crank levers, through the pins 154, so as to place the rear members of said bell crank levers in position to be restrained by the pawls 152 when the racks are restored home.

From the above description it will be seen that the pawls 152 which are operated by the racks control the bell cranks 153. When the bell cranks 153 are not released by the pawls 152 it is obvious that no printing can occur.

I provide a pin 153ª on the bell crank 153 identified with the tenths decimal rack bar 100ª, which pin coöperates with a supplemental restraining pawl 519 pivotally mounted on the restraining pawl 152. A link 520 connects the supplemental restraining pawl with a bell crank lever 521 mounted on the framing of the machine (see Fig. 8), which bell crank lever has its upper member engage a sliding plate 522 having guiding slots by which it is slidingly mounted on the forward cross frame bar of the machine. A spring 523 tends to hold the plate 522 to the left, in which position the supplemental restraining pawl is depressed in front of the pin 153ª, and notwithstanding the movement of the tenths decimal rack bar 100ª and the operation of the restraining pawl 152 no printing impression can be made from the type carried by this bar because the bell crank lever 153 identified with the printing hammer related to this rack bar is prevented from moving.

To raise the supplemental restraining pawl 519 and permit printing impressions to be made from the type carried by the tenths decimal rack bar 100ª, means are provided on the shaft 48 upon which the forward totalizer wheels 119 are mounted, to engage the plate 522, or rear extension pin 524 mounted on said plate, and move said plate to the right, in the full line position shown in Fig. 8. The means for doing this is a pin 525 extending from a collar fixed on shaft 48. When the paper carriage restores the forward totalizers, or the forward totalizers are restored manually, the pin 525 engages the projection 524 and moves the plate 522 to the right, which raises the supplemental restraining pawl 519 and permits printing impressions being made from the type carried by the tenths decimal rack bar. Thus in adding fractions in the left-hand group of totalizer wheels, the items and totals thereof containing such fractions may be printed together with the proper fractions.

In making extensions pendants 235 are provided for the tenths and hundredths decimal rack bars so that when a fraction is introduced into the machine as heretofore described such fraction will also be set up decimally in the multiplying devices by positioning the proper pendants 235.

It is not desirable to print the small characters representing the quarters as contained on the three printing type carried by the tenths decimal rack bar, because such characters would be misleading when printed in connection with the middle and right-hand totalizers, and especially to persons unfamiliar with the work of the machine. Indeed, they would not make a correct record of the tenths of a unit as heretofore mentioned; hence the provision of means to prevent the operation of the printing devices when any forward totalizer is in coöperative relation with the racks except the left-hand totalizer. The spring 523 before referred to will, when the groups of forward totalizer wheels are shifted to the left to bring the middle or right-hand group of totalizer wheels into coöperative relation with the racks, move the plate 522 to the left and position the supplemental restraining pawl 519 in front of the pin 153ª, and thus prevent the bell crank 153 from moving, so that the printing hammer identified with the tenths decimal rack bar will not be operated.

In view of the fact that no provision is made for printing from the tenths rack bar whenever the middle and right-hand group of totalizer wheels are in operative position with relation to the racks, means are provided to prevent the operation of the carrying devices from the wheel 119ª in engagement with the tenths decimal rack, this means consisting in removing the tripping projection from this particular wheel in each of these groups. Were this not done the extensions which are made in the rear totalizer and which, upon the operation of the split cent key either remain as the original number of units minus the decimals, or is increased one unit by reason of the addition to the decimal, would, when transferred to either of these forward totalizers, be augmented by the wheel identified with the tenths decimal rack bar carrying into the units column. To illustrate: In the instance of the two items under consideration throughout the description of the operation of this machine, the operation of the split cent key caused the rear totalizer to stand at $.83 and $2.37 respectively, which two sums were introduced into either the middle or right-hand totalizer and there added together, making a total of $3.20. If now the register wheel 119ª in either of these forward totalizers identified with the tenths decimal rack bar were permitted to carry into the units in this transferring operation, the said wheel would, by accumulating the tenths of a cent remaining after adding five, in the totalizer 268, eventually carry one into the units wheel in the forward totalizer 119, which one would not belong there, and thus the total of the extensions would be incorrect.

*Backing up the tripping pawls.*—In the machine of my former patent each of the wheels 119 and 268 is provided with a tripping projection 120 (see Fig. 5), which as each wheel makes a complete revolution, will strike a pendant pawl 121, forcing said pawl forwardly so that the pin 121ª will engage the pendant projection 123 of a tripping lever 124 pivoted at 125. Tripping lever 124 carries a pin 126 which lies under the forward end of a shouldered bar 127 mounted in a slot in the upper edge of a cross piece 128, and whose rear end has a slot and pin connection with a swinging toothed segment 129 pivotally mounted on a bar 130 provided with a rearwardly extending finger 131. A spring 132 is connected to this toothed segment 129 and when the forward end of bar 127 is lifted so that its shoulder is out of engagement with the cross frame bar 128 a spring 134 forces bar 127 slightly forward, so that its shoulder rests in the bottom of the slot in bar 128. I shall not further describe the operation of this carrying mechanism as the same is set forth in full in the before mentioned patent. I will state, however, that in practice I have found that the pendants 123 being supported solely from the pivot rod 125 had a tendency to spring upon the reverse rotation of the adding wheels as in the total-taking operation. This tendency, while not objectionable, in that it was not sufficient to interfere with the operation of the machine, can be very easily and conveniently overcome by providing a solid back stop for the pendants 123, which I propose doing in the machine shown in the accompanying drawings.

By referring to Figs. 5, 6 and 8 it will be seen that the total key rod 170 which connects to the bell crank lever 172, operates a rod 526 whose upper end is threaded and provided with a nut 527. The upper end of the rod is free to move through a bell crank lever 528, and when the total key has been depressed slightly the final depressing movement will cause the nut 527 to engage the bell crank lever 528, the upper end of which bell crank lever is connected to a sliding bar 529. This bar 529 is in the form of a comb between whose teeth, when in its normal position, the pendants 123 operate as shown in Figs. 6 and 8. When, however, the total key is depressed, the bar 529 is moved longitudinally so as to bring the teeth of the comb immediately in front of the pendants 123, providing a solid backing for said pendants. When the totalizer wheels are reversely rotated in taking a total it would be impossible for the pendants 123 to yield or spring forwardly to an abnormal position.

*Locking the decimal rack bars against movement when taking a total.*—The comb plate 529 which provides a solid back for the pendants 123 is normally pulled to the right by means of a spring 530. The position of the comb plate whereby its teeth are located between the pendants 123, as shown in Fig. 8, is determined by a pin 531 engaging the sliding plate 522, whose guiding slots determine its position.

532 indicates a bent portion of the plate 522, which is preferably bifurcated, as shown in Figs. 8, 8ª, 8ᵇ and 8ᶜ. The purpose of this bifurcated extension of plate 522 is to lock the tenths and hundredths decimal rack bars against movement when the total key is operated, notwithstanding the fact that the middle and right-hand forward totalizers may be in coöperative relation to the racks, and that said racks may be operated as usual in computing decimals.

It will be remembered that the tenths decimal rack bar is provided with three printing type for expressing fractions in fourths. If the tenths decimal rack bar were permitted to move forward in taking a total, it is obvious that if two, five or seven tenths were to be expressed thereby, the figures 1, 2 and 3, expressing quarters, would be printed, which would be confusing. Therefore, it is desirable to lock the tenths and hundredths decimal rack bars against movement in taking a total from the middle and right-hand forward totalizers. These decimal rack bars are not, of course, interfered with when a total is taken from the rear totalizer by pressing the product key. When, however, the "T" key is depressed, the plate 529 is moved to the left in what might be termed its third position, as shown in Fig. 8ᶜ, and this movement causes the spring 523 connected to the plates 522 and 529 to cause the plate 522 to hug the pin 531 and move leftward with the comb plate 529. In this leftward position the prongs of the depending extension 532 are placed in line with the tenths and hundredths decimal rack bars so that said rack bars cannot move forward. When the "T" total key is released when the power shaft is rocked forward, the bar 529 and plate 522 are restored to normal position, shown in Fig. 8ᵇ, in which normal position the decimal racks are free to move. Another reason why it is desirable to arrest the tenths and hundredths rack bars in taking a total from the middle and right-hand forward totalizers is because the wheels 119ᵃ in said middle and right-hand totalizers with which they coöperate have no tripping projections, and consequently on their reverse rotation they would permit the tenths and hundredths rack bars to move forward to their ninth position.

The locking of the tenths and hundredths decimal rack bars occurs only when taking a total from the middle and right-hand totalizers. When the plate 522 is in the position shown in Figs. 8 and 8ᵃ as a result of the pin 525 forcing said plate to the right, the left-hand group of totalizer wheels is in operative relation to the racks; and as this is the only group of forward totalizer wheels in which decimals may be computed in the machine shown in the accompanying drawings, it is obvious that in such computation the tenths and hundredths decimal racks should not be interfered with in the taking of a total. Therefore, when the total key "T" is operated the spring 523 will permit the comb plate 529 to move independently of the plate 522, which plate 522 is being held rigidly in position by the plate 525. In this position of plate 522 the supplemental restraining pawl 519 is raised so as to make a printing impression from the type carried by the tenths decimal rack bar, which type in the machine shown would print quarters, as before described. Wheels 119 in the left-hand group of totalizers which coöperate with the tenths and hundredths decimal rack bars are each provided with tripping projections so that they will arrest their coöperating rack bars in proper position in the total-taking operation.

Having thus described the invention, what is claimed as new and desired to be secured by Letters Patent is:

1. In a calculating machine the combination with means for decimally multiplying numbers, a totalizer in which the products are accumulated, and means whereby certain decimals in the product are eliminated, or increased and computed in the totalizer as a digit of next higher denomination.

2. In a calculating machine, the combination of totalizer wheels, actuating racks therefor, printing type positioned by said racks, a total key and connections whereby a total may be taken, and means for preventing the operation of type of low denomination in total taking operations.

3. In a calculating machine, the combination of totalizer wheels, actuating racks therefor, printing type positioned by said racks, means for adding a predetermined digit to said total through one of said racks, and means for making a record of the total from said totalizer of the amount registered therein, except in the wheel operated a predetermined distance.

4. In a calculating machine, the combination of totalizer wheels, carrying mechanism, actuating racks therefor, printing type under the control of certain of said racks, and means for effecting a relative lateral movement between said totalizer and said racks, whereby digits of lower denomination will be eliminated in total taking operations.

5. In a calculating machine, the combination of totalizer wheels, actuating means therefor, and means for taking the total from said totalizer, said means excluding the amount registered on a certain wheel or wheels of lower denomination.

6. In a calculating machine, the combination of totalizer wheels, carrying mechanism, actuating racks therefor, means for effecting a relative lateral movement between said racks and wheels in multiplying operations, and means for restoring said parts to normal position prior to taking a product therefrom, whereby a certain wheel or wheels of low denomination are prevented from yielding the total or product represented therein.

7. In a calculating machine, the combination of totalizer wheels, carrying mechanism, actuating racks, means for effecting a relative lateral movement between said totalizer and racks in the operation of multiplying, means for restoring said parts to normal position prior to taking a total or product therefrom, and means for introducing a predetermined number into one of said wheels, said means preventing the number registered on said wheel from appearing in a total taken from said totalizer.

8. In a calculating machine, the combination of totalizer wheels, carrying mechanism, actuating racks therefor, means for introducing a predetermined digit into one of said totalizer wheels, whereby the number registered on said wheels, plus the number introduced therein, may operate the next wheel of higher order through said carrying mechanism, and means for obtaining a total from said totalizer as represented in all of the wheels of the denomination higher than the one into which said predetermined number was introduced.

9. In a calculating machine, the combination of product registering wheels, a second set of registering wheels, means for transferring the product from one register to the other, and means for automatically adding a predetermined number into a product registering wheel of lowest denomination, at the time of said transfer.

10. In a calculating machine the combination of product register wheels, a second set of register wheels, means for transferring the product from the product registering wheels of said second set of register wheels, and means for automatically adding a number to the product register wheels, whereby the product will be added to, and transferred as an increased number.

11. In a calculating machine, the combination of a set of registering wheels in which a product including decimals is registered, a second set of registering wheels, and means for automatically raising the value of a decimal appearing in said product registering wheels to a whole number.

12. In a calculating machine, the combination of a product register in which whole number and decimals are registered, a second set of register wheels, and means for automatically increasing the value of a decimal in the product register to a whole number, and eliminating the decimals in said product register.

13. In a calculating machine, the combination of product register wheels, multiplier keys for controlling the same, and another key in control of one wheel only of said product register for introducing a predetermined number therein.

14. In a calculating machine, the combination of product register wheels, keys for controlling them, and another key for adding a predetermined amount to one denominational element only of said product register.

15. In a calculating machine, the combination of product registering wheels, a second set of registering wheels, multiplier keys in control of said product registering wheels, another key for adding a predetermined amount to a wheel of certain denomination in said product register, whereby the next adjacent wheel of higher order of said product register may be operated, and means for transferring the number registered in said product register, except in the wheel operated by introducing a predetermined number therein.

16. In a calculating machine, the combination of two groups of totalizer wheels, actuating racks therefor, printing type positioned thereby, and means whereby a number registered in wheels of certain high denominations only may be transferred to the other group of totalizer wheels, and a record thereof made.

17. In a calculating machine, the combination of two groups of totalizer wheels, actuating racks therefor, and means for transferring a number registered in certain wheels of high denomination only from one totalizer to the other.

18. In a calculating machine, the combination of two groups of totalizers, actuating racks therefor, one of said groups of totalizers having a greater number of actuating racks than the other, and a key in connection for transferring a number registered in one group of totalizer wheels to the other through the medium of the racks common to both totalizers.

19. In a calculating machine, the combination of two groups of totalizers, actuating racks therefor, there being a greater number of actuating racks for one totalizer than the other, means for introducing a number into the totalizer through the racks individual thereto, and a key in connection for transferring such number into the other totalizers.

20. In a calculating machine, the combination of two groups of totalizers, actuating racks common thereto, additional actuating racks individual to one of said totalizers, means including the racks for registering numbers into the totalizer having excessive number of racks, recording mechanism, means including the racks for taking a total of the number registered in said totalizer, and transferring said total into the other totalizer through the medium of the racks common to both groups of totalizers.

21. In a calculating machine, the combination of two groups of totalizers, actuating racks common thereto, additional actuating racks individual to one of said totalizers, means for laterally moving the totalizer having said additional racks in the operation of multiplication, means for restoring said totalizer to its normal position whereby certain of the wheels of low denomination mesh with said additional racks, and means for transferring the number registered in the wheels of high denomination into the other totalizer through the medium of the racks common to both totalizers.

22. In a calculating machine, the combination of two groups of totalizers, type carrying racks common to both groups of totalizers, typeless racks individual to one totalizer, multiplying keys for controlling numbers registered in the totalizer coöperating with the typeless racks, means independent of said multiplier keys for introducing a predetermined number into said totalizer through said typeless racks, and means for engaging said totalizers with said racks to transfer a number from one into the other through the medium of the type carrying racks.

23. In a calculating machine, the combination of two groups of totalizer wheels, carrying mechanism for each group, type carrying racks common to both groups, typeless racks individual to one group, multiplier keys for controlling the registration of partial products into the group which coöperates with the typeless racks, means for perfecting relative lateral movement between said groups of totalizer wheels and its racks in multiplying operation, and means for restoring said parts to normal position prior to taking the product therefrom, whereby the typeless racks clear the wheels with which they coöperate and the type carrying racks are positioned to make a record of certain high denominations only of the product.

24. In a calculating machine, the combination of a product register, type carrying racks coöperating therewith for introducing the whole numbers therein, typeless racks coöperating therewith for introducing decimals therein, a second set of register wheels which coöperate with type carrying racks only, means for operating said product register through the medium of one of said typeless racks whereby a decimal is increased to a whole number, and means for transferring said whole number through the medium of said type carrying racks to the second set of register wheels.

25. In a calculating machine, the combination of two groups of totalizers, type carrying racks common to both of said groups capable of introducing numbers thereinto, typeless racks individual to one group, and means for transferring a number from one group to the other through the medium of said type carrying racks.

26. In a calculating machine, the combination of two groups of totalizer wheels, type carrying racks common to both of said groups, typeless racks individual to one group for registering numbers of low denomination therein, and means for engaging both groups of totalizers with their respective racks, whereby a number registered in one will be transferred to the other, the said typeless racks coöperating with their wheels respectively to restore them to zero.

27. In a calculating machine the combination of two groups of totalizers, type carrying racks coöperating therewith, means for taking the total from one or the other groups and making a record thereof, and typeless racks coöperating with one group for registering numbers therein, which numbers are only printed when transferred into wheels of higher denomination.

28. In a calculating machine, the combination of two groups of totalizers, type carrying racks coöperating therewith, typeless racks coöperating with one group of totalizers and capable of introducing numbers therein, and means for restoring the totalizers coöperating with said typeless rack to zero, and making a record of that portion of the number registered therein of the same denomination as the type carrying racks.

29. In a calculating machine, the combination of two groups of totalizers, type carrying racks common to both groups of totalizers, means for registering numbers into each group independently of the other, means for transferring numbers from one group to the other through the medium of said type carrying racks and making a record thereof, typeless racks coöperating with one group of totalizers, and means for introducing numbers into said totalizers through said typeless racks.

30. In a calculating machine, the combination of two groups of totalizers, type carrying racks coöperating therewith, typeless racks coöperating with one of said totalizers, multiplier key for controlling the registration of numbers into the totalizer coöperating with said typeless racks, means for introducing the number into said totalizers through a typeless rack independently of said multiplier keys, and means for transferring the numbers so registered in said totalizer through the medium of the type carrying racks to the other totalizer.

31. In a calculating machine, the combination of two groups of totalizers, type carrying racks for introducing items into said groups of totalizers and for transferring them from one group of totalizers to the other, typeless racks coöperating with one group of totalizers, and means for introducing a number into said totalizers through said typeless racks.

32. In a calculating machine the combination of a product totalizer, and means, including racks, for obtaining a product in said totalizer, a second totalizer for accumulating said products, means for separately recording the products as they are accumulated in said second totalizer, certain of the racks employed in obtaining said products being so constructed that a portion only of the product is introduced into the second accumulator.

33. In a calculating machine, the combination with means for decimally multiplying numbers, including a product totalizer and two or more totalizers to which the product in the product totalizer may be transferred and accumulated, one of said totalizers having decimal wheels to receive decimals from the product totalizer and means for making a record of the product so transferred, except that portion which is received in the decimal wheels.

34. In a calculating machine, the combination with means for decimally multiplying numbers, and two or more totalizers to which the product in said product totalizer may be transferred and accumulated, and means for eliminating certain of the decimals in the product in the transferring operation.

35. In a calculating machine, the combination with means for decimally multiplying numbers, including a product totalizer, a second totalizer, means for transferring whole numbers from said product totalizer to said second totalizer, decimal-printing devices, and means for rendering said decimal-printing devices inoperative.

36. In a calculating machine, the combination with means for decimally multiplying numbers, including a product totalizer capable of receiving and accumulating decimals from said multiplying mechanism, fraction printing mechanism, and means for rendering said fraction printing mechanism inoperative.

37. In a calculating machine, the combination with a product totalizer, a second totalizer capable of receiving and accumulating whole numbers only from said product totalizer, means coöperating with said product totalizer for adding a predetermined number to a decimal appearing therein to increase its value to a whole number, means for transferring the whole numbers appearing in the product totalizer to said second totalizer, printing mechanism for said whole numbers and decimals, and means for rendering the decimal-printing mechanism inoperative when whole numbers are being transferred.

38. In a calculating machine the combination of a product totalizer, multiplying mechanism including digit keys for controlling a portion of the multiplying mechanism, means independently of said digit keys for introducing a predetermined number into a wheel of certain denomination, and a second totalizer for adding together the products of a denomination higher than that represented by the wheel in which said predetermined number is added.

39. In a calculating machine, multiplying mechanism, means for converting fractions into decimals, computing said fractions decimally in the operation of multiplication, in combination with means for printing said fractions as fractions, an adding totalizer, means for transferring the products to said adding totalizer, and means for raising the value of the decimals in the product before such transfer.

40. In a calculating machine, a key board having common fractions expressed on its keys, in combination with means for decimally expressing the equivalents of said fractions, multiplying mechanism, including a product totalizer, for multiplying said fractions decimally, means for eliminating the decimals from the product totalizer, and an adding totalizer, where said products are added together as whole numbers.

41. In a calculating machine, a key board having keys bearing common fractions, in combination with stops positioned by the operation of said keys and racks which are controlled by said stops, said racks indicating said fractions decimally.

42. In a calculating machine having means including a totalizer for computing fractions, having different numerators and denominators in combination with a key board containing keys whereby the decimal equivalent to said fractions may be introduced into the totalizer.

43. In a calculating machine having a totalizer for computing fractions, having different denominators in combination with a key board, whereby the decimal equivalents of said fractions may be introduced into the totalizer, and printing mechanism for making a record of said fractions as fractions.

44. In a calculating machine, a totalizer, keys, stops controlled thereby, and means controlled by a single key for positioning a a plurality of stops, whereby the decimal equivalents of a common fraction may be introduced into the totalizer.

45. In a calculating machine a totalizer, a key having a common fraction expressed thereon, means under the control of said key for introducing a decimal equivalent to said common fraction into the totalizer.

46. In a calculating machine, the combination of tenths and hundredths rack bars, stops for said rack bars, a key for positioning a stop for the tenths rack bar, and means operated by the positioned stop to position the stop for the hundredths rack bar; substantially as described.

47. In a calculating machine, the combination with tenths and hundredths decimal rack bars, keys, a series of key-positioned stops for the tenths rack bar, whereby said rack bar may be arrested in any of several predetermined positions, a stop for the hundredths rack bar, and means for positioning said hundredths rack bar stop when certain of the tenths rack bar stops are positioned; substantially as described.

48. In a calculating machine, the combination with tenths and hundredths decimal rack bars, keys, key-positioned stops for arresting said tenths rack in one of nine different positions depending upon the key operated, a single stop for the hundredths rack, and means whereby said last mentioned stop is positioned when certain of the stops for the tenths rack are actuated; substantially as described.

49. In a calculating machine, the combination of a totalizer for computing concrete numbers and decimals, and printing mechanism for printing the total contained in said totalizer including a common fraction equivalent to the decimal; substantially as described.

50. In a calculating machine, the combination with a totalizer for decimally computing numbers, a printing mechanism containing type bearing characters representing fractions having a denominator other than ten; substantially as described.

51. In a calculating machine, the combination with a totalizer, actuating racks therefor including tenths and hundredths decimal racks, a total key, and stops positioned by said total key to prevent the movement of said decimal racks in the total-taking operation; substantially as described.

52. In a calculating machine, the combination of a totalizer, actuating racks therefor, including tenths and hundredths decimal racks, a total key, stops for preventing the movement of said decimal racks, and a connection between said total key and said stops whereby the stops are moved into operative position when said total key is operated; substantially as described.

53. In a calculating machine, the combination of a totalizer, actuating racks therefor, said racks including tenths and hundredths decimal racks, stops for preventing the movement of said racks, a total key, a yielding connection between said total key and said stops whereby said total key normally positions said stops to prevent movement of said racks, and means for positively holding said stops in an inoperative position in which the operation of the total key cannot affect them; substantially as described.

54. In a calculating machine, the combination with a plurality of totalizers, a single set of actuating racks therefor, said racks including tenths and hundredths decimal racks, means for moving said totalizers into and out of operative relation to said racks, a total key operative in connection with the total-taking operations with respect to all of said totalizers, means operated by said total key to prevent movement of said decimal racks in the total-taking operation of certain of said totalizers, and means whereby said decimal racks are rendered operative during the total-taking operation of a certain other totalizer; substantially as described.

55. In a calculating machine, the combination with a totalizer and its carrying mechanism, a total key, and means positioned by said total key in total-taking operations for preventing flexure of certain parts of the carrying mechanism; substantially as described.

56. In a calculating machine, the combination with a totalizer and its carrying mechanism, of a total key, and means operated by the total key for rigidly supporting parts of the carrying mechanism during the total-taking operation; substantially as described.

57. In a calculating machine, the combination with a totalizer and its carrying mechanism, of a total key, and a comb plate which is shifted upon the operation of said total key to engage parts of the carrying mechanism; substantially as described.

58. In a calculating machine, the combination with a totalizer, actuating devices therefor, printing type positioned by said actuating devices, type hammers coöperating with said printing type, restraining pawls positioned by said actuating devices for controlling said type hammers, and a supplemental restraining pawl; substantially as described.

59. In a calculating machine, the combination with a totalizer and its actuating racks, of printing mechanism controlled by said racks, and means for rendering inoperative the control of said printing mechanism by certain of said racks; substantially as described.

60. In a calculating machine, the combination with a totalizer and its actuating racks including decimal racks, of a printing mechanism controlled by said racks, and means for rendering inoperative the control of said printing mechanism by said decimal racks; substantially as described.

61. In a calculating machine, the combination with a totalizer, means for introducing and accumulating whole numbers and fractions therein, means for printing items composed of whole numbers and their fractions introduced into said totalizer, said means also printing the total of said items comprising whole numbers and fractions; another totalizer, and means for transferring whole numbers only to said second totalizer; substantially as described.

62. In a calculating machine, the combination with a totalizer, means for introducing and accumulating whole numbers and fractions in said totalizer, said fractions being computed decimally, means for printing the total in said totalizer as a whole number and a common fraction; another totalizer, and means for transferring whole numbers only to said second totalizer; substantially as described.

63. In a calculating machine, the combination with a totalizer, and means for introducing whole numbers and common fractions therein, said fractions being computed decimally in said totalizer; another totalizer, and means for transferring whole numbers only to said second totalizer; substantially as described.

64. In a calculating machine, the combination with a totalizer in which fractions are computed decimally, and printing mechanism controlled by said totalizer, said printing mechanism containing characters representing common fractions to express the decimal in the totalizer; another totalizer, and means for transferring whole numbers only to said second totalizer; substantially as described.

65. In a calculating machine, the combination with a totalizer for computing fractions decimally, a printing mechanism controlled by said totalizer, said printing mechanism containing printing characters representing common fractions, a total key, and means whereby when said total key is operated the totalizer controlling the printing mechanism will position a printing character in printing line, whereby the equivalent of the decimal contained in the totalizer may be printed and expressed as a common fraction; substantially as described.

66. A calculating machine comprising printing means and means which when operated automatically disables the printing means of all characters below a predetermined value and will add one to the number printed when the number eliminated is greater than a predetermined number.

67. In a calculating machine, the combination of a product totalizer, type carrying and typeless racks coöperating therewith, the latter being designed to compute decimals only, an adding totalizer, and means whereby only the numbers registered in the product totalizer wheels identified with the type carrying racks may be transferred to the adding totalizer.

68. In a calculating machine, the combination of a product totalizer, an adding totalizer, racks common to both totalizers, additional racks individual to the product totalizer, said last mentioned racks being designed to compute decimals only, and means for transferring numbers registered in the product totalizer, of a higher order than said decimal racks, to the adding totalizer through the medium of said first mentioned racks.

In testimony whereof I hereunto affix my signature in the presence of two witnesses, this twenty third day of October 1908.

HUBERT HOPKINS.

Witnesses:
F. R. CORNWALL,
GEORGE BAKEWELL.